(12) United States Patent
Prajapati et al.

(10) Patent No.: US 10,528,102 B2
(45) Date of Patent: Jan. 7, 2020

(54) SYSTEM AND METHOD FOR IMPROVED THERMAL MANAGEMENT OF A PORTABLE COMPUTING DEVICE WITH SKIN TEMPERATURE SENSORS

(71) Applicant: QUALCOMM Incorporated, San Diego, CA (US)

(72) Inventors: Rupal Govindbhai Prajapati, San Diego, CA (US); Terance Wijesinghe, San Marcos, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/171,308

(22) Filed: Oct. 25, 2018

(65) Prior Publication Data

US 2019/0064894 A1 Feb. 28, 2019

Related U.S. Application Data

(63) Continuation of application No. 14/820,450, filed on Aug. 6, 2015, now abandoned.

(51) Int. Cl.
*G06F 1/20* (2006.01)
*G05B 15/02* (2006.01)
*G06F 1/32* (2019.01)
*H05K 1/02* (2006.01)

(52) U.S. Cl.
CPC ............. *G06F 1/206* (2013.01); *G05B 15/02* (2013.01)

(58) Field of Classification Search
CPC ...... G06F 1/206; G06F 11/3058; G06F 1/203; G06F 1/3203; G06F 1/3206; G06F 1/3218; G06F 1/3265; H05K 2201/10151; H05K 1/0201; H05K 1/0212; H05K 2201/10128; H05K 2201/10136
USPC ......................................... 700/121, 278, 300
See application file for complete search history.

(56) References Cited

U.S. PATENT DOCUMENTS

| | | | |
|---|---|---|---|
| 8,601,428 | B2 | 12/2013 | Burrell et al. |
| 8,788,866 | B2 | 7/2014 | Anderson et al. |
| 8,972,759 | B2 | 3/2015 | Doshi et al. |
| 9,471,117 | B1 | 10/2016 | Spangler |

(Continued)

OTHER PUBLICATIONS

International Preliminary Report on Patentability—PCT/US2016/041718, The International Bureau of WIPO—Geneva, Switzerland, dated Oct. 19, 2017.

(Continued)

*Primary Examiner* — Michael J Brown
(74) *Attorney, Agent, or Firm* — Edward J. Meisarosh

(57) ABSTRACT

Methods and systems for improved thermal management of a portable computing device ("PCD") with skin temperature sensors are disclosed. In an exemplary embodiment, a plurality of skin sensors are provided in the PCD, the plurality of skin sensors disposed on a flexible printed circuit board ("Flex PCB") located internal to the PCD proximal to an outer surface of the PCD. It is determined whether to obtain temperature information from one or more of the plurality of skin sensors, and one or more skin sensors from which to obtain temperature information are identified. The temperature information is obtained from the identified one or more skin sensors, and the temperature information is applied to a thermal mitigation policy.

21 Claims, 9 Drawing Sheets

(56) References Cited

U.S. PATENT DOCUMENTS

| | | |
|---|---|---|
| 2008/0167071 A1 | 7/2008 | Forstall et al. |
| 2012/0271480 A1 | 10/2012 | Anderson et al. |
| 2014/0236380 A1 | 8/2014 | Alton et al. |
| 2014/0240031 A1 | 8/2014 | Vadakkanmaruveedu et al. |
| 2014/0245029 A1 | 8/2014 | Jain et al. |
| 2014/0358318 A1 | 12/2014 | Lin et al. |
| 2014/0362518 A1 | 12/2014 | Huang et al. |
| 2017/0038806 A1* | 2/2017 | Prajapati ................ G05B 15/02 |

OTHER PUBLICATIONS

International Search Report and Written Opinion—PCT/US2016/041718—ISA/EPO—dated Oct. 17, 2016, 13 pages.
Xie Q., et al., "Therminator: A Thermal Simulator for Smartphones Producing Accurate Chip and Skin Temperature Maps," ACM, 11-13, Aug. 2014, La Jolia, CA, USA, 6 pages.

* cited by examiner

SYSTEM AND METHOD FOR IMPROVED THERMAL MANAGEMENT OF A PORTABLE COMPUTING DEVICE WITH SKIN TEMPERATURE SENSORS

The present application is a continuation of U.S. Non-Provisional patent application Ser. No. 14/820,450 filed Aug. 6, 2015, the disclosure of which is hereby incorporated by reference in its entirety.

DESCRIPTION OF THE RELATED ART

Portable computing devices ("PCDs") are becoming necessities for people on personal and professional levels. These devices may include cellular telephones (such as smartphones), portable digital assistants ("PDAs"), portable game consoles, palmtop computers, tablet computers, wearable and other portable electronic devices.

One unique aspect of PCDs is that they typically do not have active cooling devices, like fans, which are often found in larger computing devices such as laptop and desktop computers. Instead of active cooling devices like fans, PCDs may rely passive cooling devices, such as heat sinks and/or on the spatial arrangement of electronic packaging so that two or more active and heat producing components are not positioned proximally to one another. Such passive cooling devices or spatial arrangement can be used to try and manage thermal energy of and among the electronic components of the PCD, as well as to manage the temperature of the outer shell of the PCD felt by a user ("skin temperature").

PCDs are limited in size and, therefore, room for components within a PCD typically comes at a premium. There usually is not enough space within a PCD for precise thermal management, especially of skin temperature, using spatial arrangements or passive cooling components. Therefore, some PCDs rely on temperature sensors embedded on the PCD chip to monitor the thermal energy, and use the measurements to apply thermal management techniques that adjust workload allocations, processing speeds, etc., to reduce thermal energy generation.

However, such temperature sensors on the PCD chip cannot accurately determine the skin temperature of the PCD, which may lead to aggressive thermal management that unnecessarily degrades the performance of the PCD and/or unnecessarily reduces the quality of service ("QoS") provided to the user of the PCD. Therefore, there is a need for system and methods for improved thermal management of the PCD with more accurate determinations of the PCD skin temperature.

SUMMARY OF THE DISCLOSURE

Various embodiments of methods and systems for improved thermal management of a portable computing device with skin temperature sensors are disclosed. In an embodiment, a plurality of skin sensors are provided in the PCD, the plurality of skin sensors disposed on a flexible printed circuit board ("Flex PCB") located internal to the PCD proximal to an outer surface of the PCD. It is determined whether to obtain temperature information from one or more of the plurality of skin sensors, and one or more skin sensors from which to obtain temperature information are identified. The temperature information is obtained from the identified one or more skin sensors, and the temperature information is applied to a thermal mitigation policy.

In another embodiment, computer system for improved thermal management in a portable computing device ("PCD") is provided. The computer system comprising a plurality of skin sensors disposed on a flexible printed circuit board ("Flex PCB") located internal to the PCD proximal to an outer surface of the PCD. The computer system further comprising a monitor module that is configured to: monitor a parameter associated with one or more components disposed on a main printed circuit board ("PCB") of the PCD parallel to the Flex PCB, the parameter indicating that a first one of the one or more components of PCD is producing thermal energy, determine based on the monitored parameter whether to obtain temperature information from one or more of the plurality of skin sensors, identify the one or more skin sensors from which to obtain temperature information, obtain temperature information from the identified one or more skin sensors, and apply the obtained temperature information to a thermal mitigation policy.

Advantageously, by more accurately determining the skin or "touch" temperature of the external surfaces of the PCD in accordance with the above embodiments, thermal mitigation techniques or strategies may be more accurately or precisely applied. More precise or accurate application of thermal mitigation avoids unnecessary reductions in PCD performance and/or reductions in QoS for the PCD, without risking either thermal degradation of the PCD components or an unpleasant experience for the PCD user from an excessive skin or "touch" temperature of the external surfaces of the PCD.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
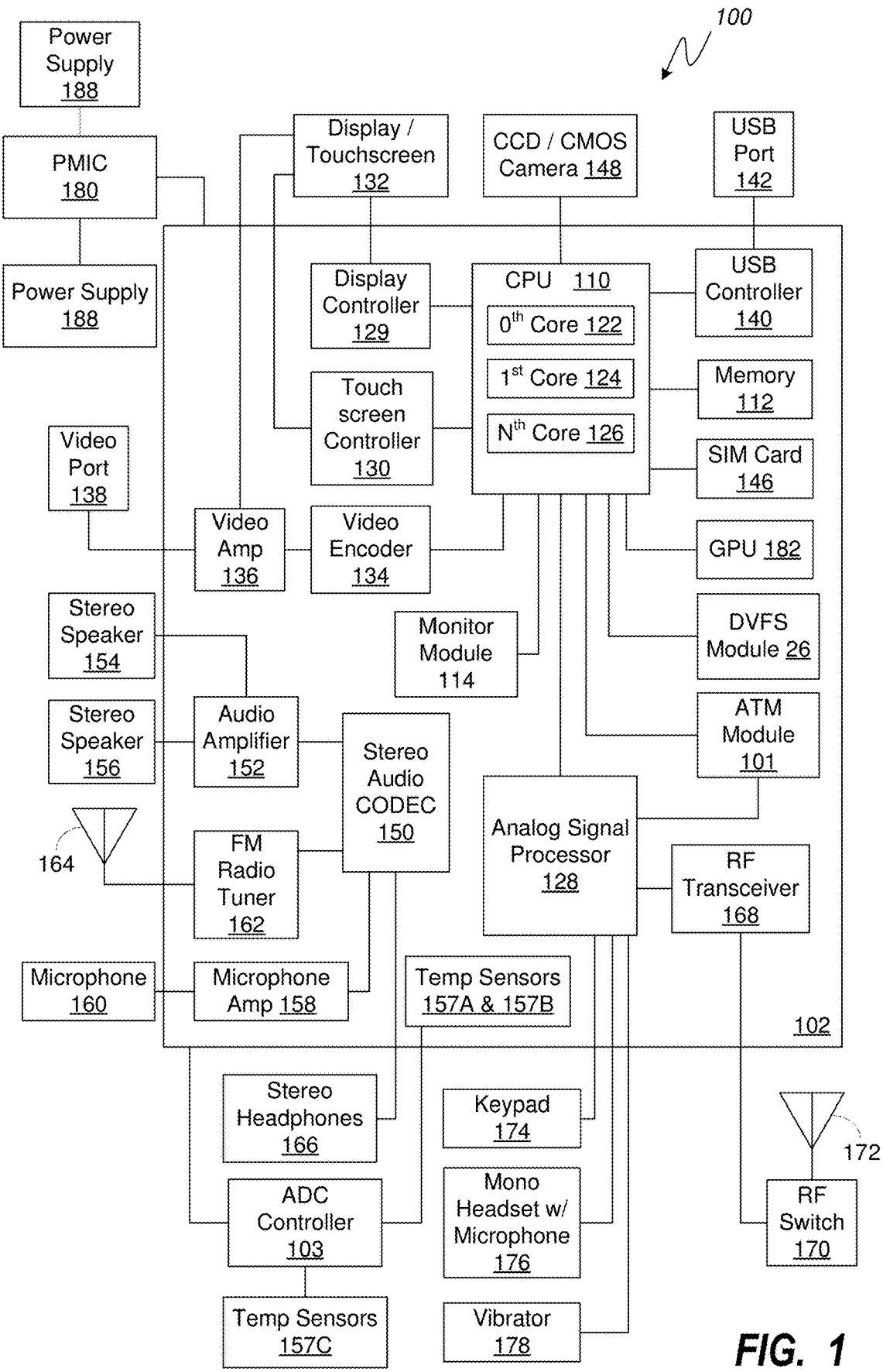
FIG. 1 is a functional block diagram illustrating an example embodiment of a portable computing device (PCD) in which systems and methods for improved thermal management with skin temperature sensors can be implemented.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system" and the like are intended to refer to a computer-related entity, either hardware, firmware, a combination of hardware and software, software, or software in execution and represent exemplary means for providing the functionality and performing the certain steps in the processes or process flows described in this specification. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "graphical processing unit ("GPU")," and "chip" are used interchangeably. Moreover, a CPU, DSP, GPU or a chip may be comprised of one or more distinct processing components generally referred to herein as "core(s)."

In this description, it will be understood that the terms "thermal" and "thermal energy" may be used in association with a device or component capable of generating or dissipating energy that can be measured in units of "temperature." Consequently, it will further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

In this description, the terms "skin temperature" and "outer shell temperature" and the like are used interchangeably to refer to a temperature associated with the outer shell or cover aspect of a PCD, such as a back cover, or a touchscreen or other display, of the PCD. As one of ordinary skill in the art would understand, the skin temperature of a PCD may be associated with a sensory experience of the user when the user is in physical contact with the PCD.

In this description, the terms "workload," "process load" and "process workload" are used interchangeably and generally directed toward the processing burden, or percentage of processing burden, associated with a given processing component in a given embodiment. Further, a "processing component" or "thermal energy generating component" or "thermal aggressor" may be, but is not limited to, a system-on-a-chip ("SoC"), a central processing unit, a graphical processing unit, a core, a main core, a sub-core, a processing area, a hardware engine, a camera, a modem, etc. or any other component residing within, or external to, an integrated circuit within a portable computing device.

In this description, the terms "thermal mitigation technique(s)," "thermal policies," "thermal management," "thermal mitigation measure(s) and the like are used interchangeably. Notably, one of ordinary skill in the art will recognize that, depending on the particular context of use or "use case," any of the terms listed in this paragraph may serve to describe hardware and/or software operable to increase performance at the expense of thermal energy generation, decrease thermal energy generation at the expense of performance, or alternate between such goals.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a tablet computer, a combination of the aforementioned devices, a laptop computer with a wireless connection, wearable products, among others.

In PCDs, the tight spatial arrangement of thermally aggressive components, systems, and/or subsystems lends to excessive amounts of heat being produced, such as for example when those certain components are asked to process workloads at high performance levels and/or to perform ongoing tasks. In many cases, the temperature threshold of the outer surface of the PCD, i.e. the "skin temperature," is the limiting factor in just how much thermal energy the components within the PCD are allowed to produce. Notably, the skin temperature threshold is often dictated by the maximum temperature to which a user may be exposed and not the maximum temperature to which the components within the PCD may be exposed. That is, the user experience as measured by the skin temperature of the PCD is often the factor from which a thermal mitigation algorithm determines that the processing performance of components within the PCD must be dialed back.

However, it has been determined that on-chip temperature sensors do not accurately reflect the actual skin temperature of the PCD, and that large increases in temperatures measured by on-chip temperature sensors do not equate to proportionally large increases in skin temperature. Thus, it has been determined that on-chip temperature sensors do not provide sufficiently accurate information to thermal mitigation algorithms as to the skin temperatures. It has been further determined that the degree to which the on-chip temperature sensors fail to correlate with the skin temperature of the PCD can vary with the architecture of the PCD, such as for example the number of cores or processors of the PCD. However, it is mechanically complicated to place thermal sensors on the skin of the PCD to measure the skin temperature.

The present systems and methods for improved thermal management with temperature sensors in a PCD provide a cost effective ability to more precisely and/or adaptively apply thermal mitigation strategies. This present systems and methods are particularly beneficial in a PCD environment since PCDs rely on throttling and power savings modes to control thermal conditions much more than do other computing environments, such as desktop computers, where other cooling mechanisms such as cooling fans are available.

As one of ordinary skill in the art would recognize, ensuring that the skin temperature thresholds are not exceeded may require one or more thermal management algorithm to implement various thermal mitigation techniques. One such technique is throttling a component or core down to a lower performance level. Such throttling strategies may include methods, applications and/or algorithms employed adjust (such as reduce) the clock speed of a central processing unit ("CPU") or the like. Such throttling strategies may mitigate a detrimental rise in operating temperature by reducing PCD performance. Another exemplary throttling method is a dynamic voltage and frequency scaling ("DVFS") method. Additionally, some embodiments may additionally, or exclusively, leverage other thermal mitigation techniques, such as operating system level thermal mitigation techniques like, but not limited to, workload shifting techniques.

The system and methods for improved thermal management with skin temperature sensors described herein, or portions of the system and methods, may be implemented in hardware or software. If implemented in hardware, the systems, or portions of the systems can include any, or a combination of, the following technologies, which are all well known in the art: sensors, discrete electronic components, integrated circuits, application-specific integrated circuits having appropriately configured semiconductor devices and resistive elements, etc. Any of these hardware devices, whether acting or alone, with other devices, or other components such as a memory may also form or comprise components or means for performing various operations or steps of the disclosed methods.

When a system or method described herein is implemented, or partially implemented, in software, the software portion can be used to perform the methods described herein. The software and data used in representing various elements can be stored in a memory and executed by a suitable instruction execution system (e.g. a microprocessor). The software may comprise an ordered listing of executable instructions for implementing logical functions, and can be embodied in any "processor-readable medium" for use by or in connection with an instruction execution system, apparatus, or device, such as a single or multiple-core processor or processor-containing system. Such systems will generally access the instructions from the instruction execution system, apparatus, or device and execute the instructions FIG. 1 is a functional block diagram illustrating an example embodiment of a portable computing device (PCD) in which systems and methods for improved thermal management with skin temperature sensors can be implemented. As shown, the PCD 100 includes an on-chip system ("SoC") 102 that includes a multi-core central processing unit ("CPU") 110 and an analog signal processor 128 that are coupled together. The CPU 110 may comprise multiple cores including a zeroth core 122, a first core 124, up to and including, an Nth core 126. Further, instead of a CPU 110, a digital signal processor ("DSP") may also be employed as understood by one of ordinary skill in the art.

In an embodiment, a monitor module 114 may be implemented to communicate with multiple operational sensors (e.g., thermal sensors 157A, 157B) distributed throughout the on-chip system 102, with the CPU 110 of the SoC 102, as well as components of the PCD 100 outside of the SoC 102. The monitor module 114 may also in some embodiments monitor skin temperature sensors 157C for temperature readings associated with a touch temperature of PCD 100 as described below. Although shown as a single component on the SoC 102 for convenience in FIG. 1, the monitor module 114 may in some embodiments comprise multiple components one, some, or all of which may not be located on the SoC 102.

As illustrated in FIG. 1, a display controller 129 and a touch screen controller 130 are coupled to the CPU 110. A touch screen display 132 external to the SoC 102 is coupled to the display controller 131 and the touch screen controller 130. Again, although shown in FIG. 1 as single components located on the SoC 102, both the display controller 131 or touch screen controller 130 may comprise multiple components, one or more of which may not be located on the SoC 102 in some embodiments.

PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the CPU 110. A video amplifier 136 is coupled to the video encoder 134 and the touch screen display 132. A video port 138 is coupled to the video amplifier 136. As depicted in FIG. 1, a universal serial bus ("USB") controller 140 is coupled to the CPU 110. In addition, a USB port 142 is coupled to the USB controller 140. A memory 112 and a subscriber identity module (SIM) card 146 may also be coupled to the CPU 110. Further, as shown in FIG. 1, a digital camera 148 may be coupled to the CPU 110 of the SoC 102. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may also be coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. In addition, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 128. An RF switch 170 may be coupled to the RF transceiver 168 and an RF antenna 172. As shown in FIG. 1, a keypad 174 may be coupled to the analog signal processor 128. In addition, a mono headset with a microphone 176 may be coupled to the analog signal processor 128. Further, a vibrator device 178 may be coupled to the analog signal processor 128. FIG. 1 also shows that a power supply 188, for example a battery, is coupled to the SoC 102 through PMIC 180. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A, 157B as well as one or more external, off-chip thermal sensors 157C. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157C may comprise one or more thermistors or other desired sensors. The thermal sensors 157C may produce a voltage drop that is converted to digital signals with an analog-to-digital converter ("ADC") controller 103. However, other types of thermal sensors 157A, 157B, 157C may be employed without departing from the scope of the invention.

In the embodiment illustrated in FIG. 1, the touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, the power supply 188, the PMIC 180 and the thermal sensors 157C are external to the SoC 102. However, it should be understood that the monitor module 114 may also receive one or more indications or signals from one or more of these external devices by way of the analog signal processor 128 and the CPU 110 to aid in the real time management of the resources operable on the PCD 100. Additionally, as discussed above, the monitor module 114 may itself comprise one or more component external to the SoC 102 in some embodiments.

In a particular aspect, one or more of the method steps described herein may be implemented by executable instructions and parameters stored in a memory 112 that may form the monitor module(s) 114, or other components discussed herein. The instructions that form the module(s) 114 may be executed by the CPU 110, the analog signal processor 128, or another processor, in addition to the ADC controller 103, to perform the methods described herein. Further, the CPU 110, analog signal processor 128, the memory 112, the instructions stored therein, or a combination thereof may serve as a means for performing one or more of the method steps described herein.

Figure 2A:
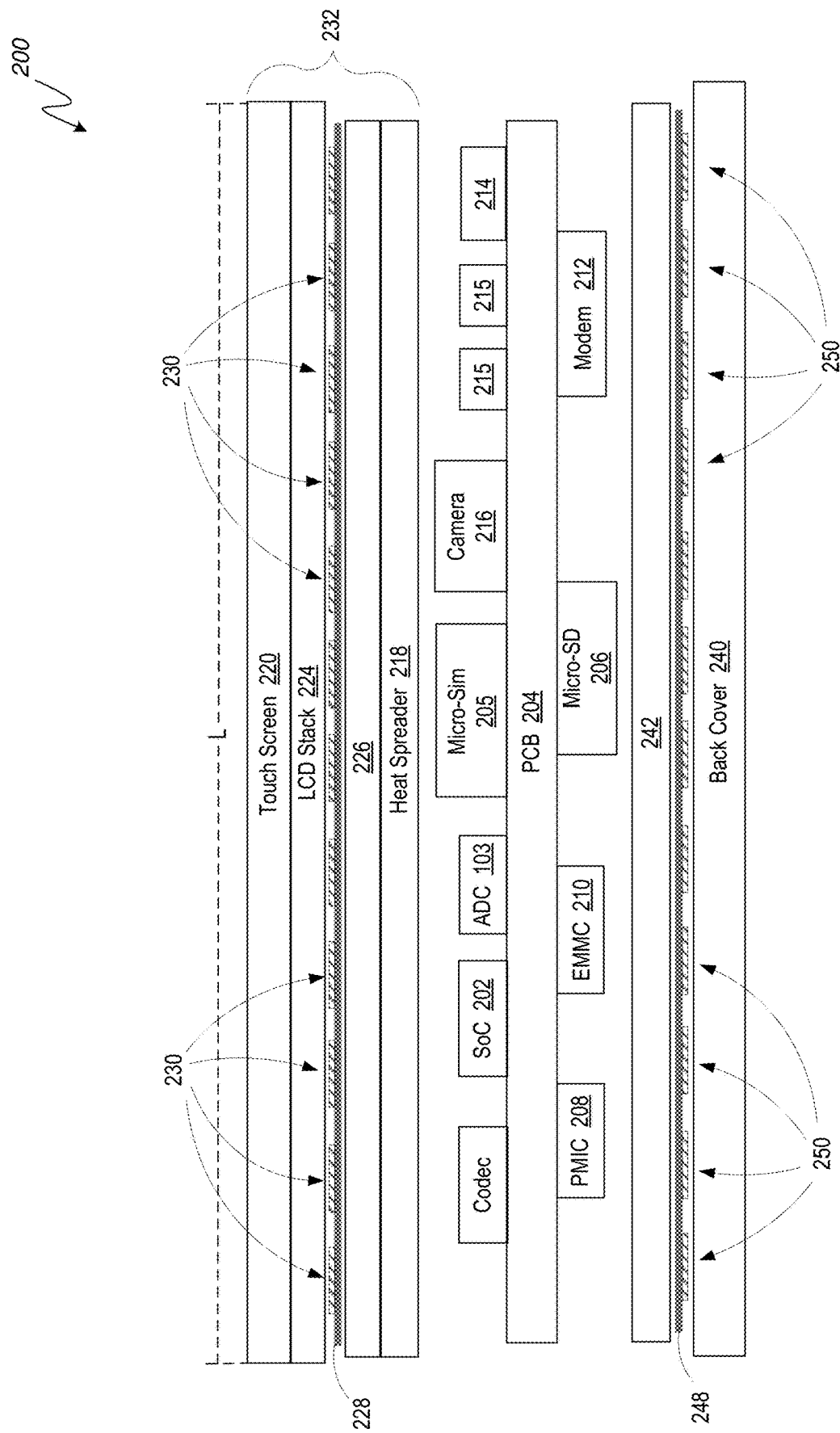
FIG. 2A is a block diagram showing a side view of a PCD in the form of a wireless telephone in which systems and methods for improved thermal management with skin temperature sensors can be implemented.
Figure 2B:
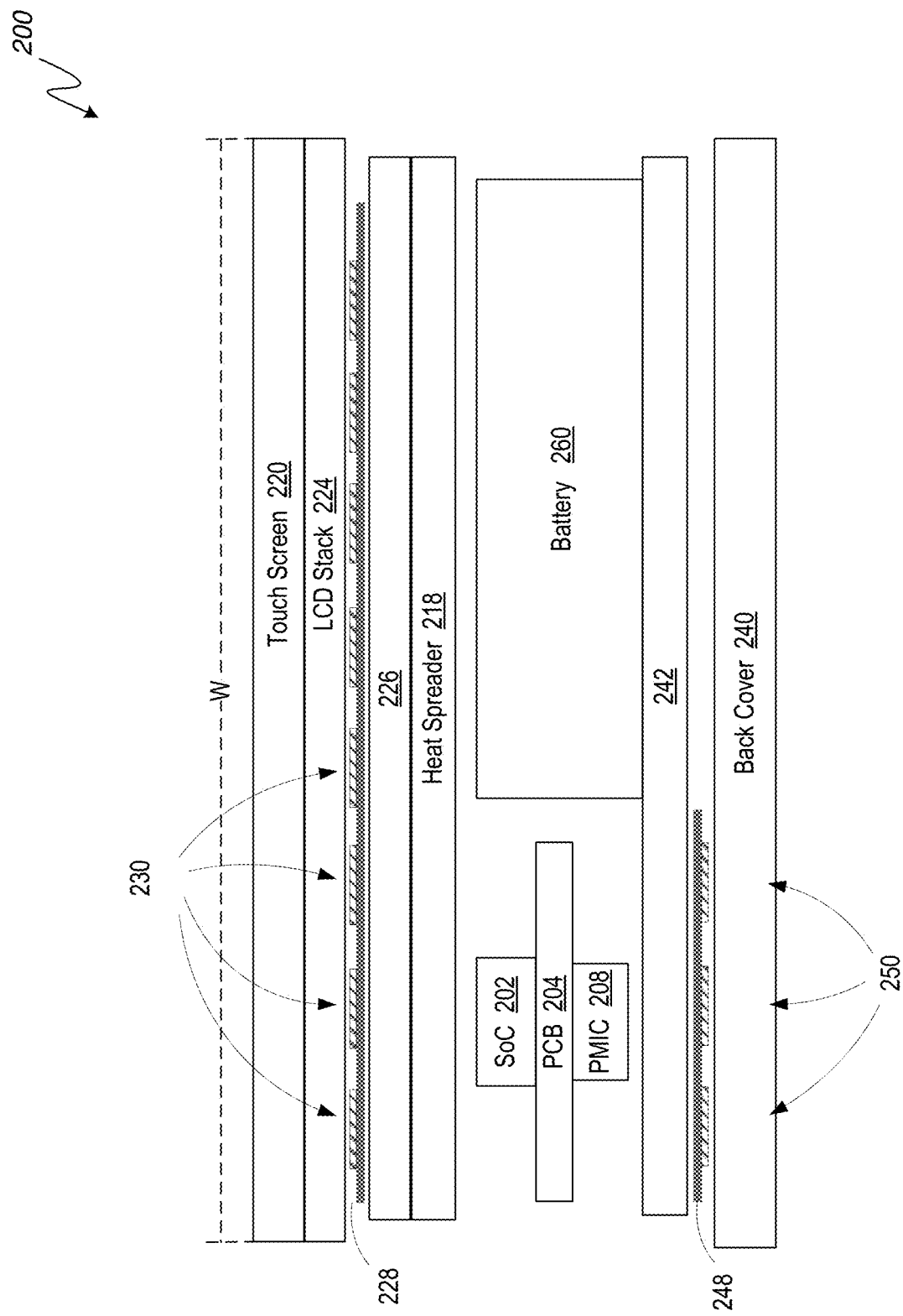
FIG. 2B is a block diagram showing a front view of the PCD of FIG. 2A.

FIGS. 2A-2B are block diagrams showing aspects of an exemplary PCD 200 in the form of a wireless telephone in which systems and methods for improved thermal management with skin temperature sensors can be implemented. For illustrative purposes, FIG. 2A shows side view of a partially exploded PCD 200 illustrating an exemplary spatial arrangement of certain hardware components of the exemplary PCD 200, the hardware components depicted in block form. The Touch Screen 220 is considered the "front/top layer" of the PCD 200, and the dimension "L" in FIG. 2A represents an illustrative length of the PCD 200 as seen from the top view of FIG. 2A.

Similarly, FIG. 2B shows a front view, also partially exploded, of the PCD 200 illustrating an exemplary spatial arrangement of certain hardware components of the exemplary PCD 200, the hardware components depicted in block form. The Touch Screen 220 is again considered the "front/top layer" of the PCD 200, and the dimension "W" represents an illustrative width of the PCD 200 as seen from the side view of FIG. 2B. Note that FIGS. 2A and 2B are not intended to be to the same scale, as FIG. 2A illustrates more details of the hardware components.

Turning to FIG. 2A, according to this exemplary embodiment, an SoC 202 is located on a printed circuit board ("PCB") 204 on the "interior" of the PCD 200, referred to herein as the PCB 204 or main PCB 204. The SoC 202 may comprise an SoC 101 as illustrated in FIG. 1 with a multi-core CPU 110 (not shown). As shown in the exemplary embodiment of FIG. 2A, more components may be attached to the PCB 204, including a Micro-Sim Connector 205 and a Micro-SD Card connector 206 as would be understood by one of ordinary skill in the art. Additional components that may be attached or connected to the PCB 204 include a power management circuit ("PMIC") 208, which may be a PMIC 180 illustrated above with respect to FIG. 1.

Similarly, PCB 204 may include in some embodiments an embedded multimedia card memory ("EMMC") 210, which may be a flash memory and controller external to the SoC 202. Further, the exemplary PCD 200 of FIG. 2 may include a modem 212 external to the SoC 202, along with associated components, such as a transceiver 214 and power amplifiers 215. As also illustrated in FIG. 2A, the exemplary PCD 200 may include a camera 216 attached to the PCB 204, which may be a CCD/CMOS Camera 148 as discussed above for FIG. 1.

As would be understood by one of ordinary skill in the art, in different embodiments the PCD 200 may include more, or fewer, component than those illustrated in FIG. 2A, and may include these components arranged differently than illustrated in FIG. 2A. For example, in some embodiments the modem 212 (and/or one or more component associated with the modem 212) may be included within the SoC 202 rather than a separate component attached to the PCB 204 as illustrated in FIG. 2A. Similarly, in other exemplary embodiments, components such as a GPU (not illustrated) may be attached to the PCB 204, external to the SoC 202 rather than being located within SoC 202 in the embodiment illustrated in FIG. 2A (see GPU 182 in FIG. 1). Additionally, the SOC 202 can be located on the Touch Screen 220 side or Back Cover 240 side of the device in various embodiments. Any and all such varying embodiments or arrangements of the PCD 200 are within the scope of this disclosure.

Enclosing the internal components connected to the PCB 204 are the Back Cover 240 and Touch Screen 220 of the PCD 200 which, along with additional casing (not illustrated) form the outer surface (or "skin") of the PCD 200. Both the Touch Screen 220 and Back Cover 240 may be made of any appropriate material as understood by one of ordinary skill in the art. Turning first to the Touch Screen 220, in the embodiment illustrated in FIG. 2A, the Touch Screen 220, LCD Stack 224, a flexible printed circuit board ("Flex PCB") 228, a layer 226, and a Heat Spreader 218 may form a Display 232 for the PCD 200. The Display 232 may be a Display 132 discussed above for FIG. 1, and may in different embodiments have more, or fewer, components than those illustrated in the exemplary embodiment of the PCD 200 shown in FIG. 2A.

Each of the Touch Screen 220, LCD Stack 224, Flex PCB 228, Layer 226 and Heat Spreader 218 may be formed of appropriate materials as would be understood by one of skill in the art. For example, the Layer 226 may be formed of graphite, while the Heat Spreader 218 may be formed of a metal such as copper or any other appropriate heat dissipating material desired. Similarly, although the exemplary Display 232 of FIG. 2A is a liquid crystal (LCD) display, other types of displays may be used instead of the illustrated LCD Display 232 as desired. As would be understood by one of ordinary skill in the art, embodiments using other types of displays may have different components than those illustrated in FIG. 2A and/or a different arrangement of such components.

The Flex PCB 228 may be a thin and flexible PCB of the type typically used in PCD displays, such as smartphone, tablet, or other portable device displays. As shown in FIG. 2A, the Flex PCB 228 may be oriented in the PCD 200 generally parallel to the main PCB 204, with the Flex PCB 228 located proximal or near to an outer surface of the PCD 200—i.e. the Touch Screen 220. As also shown in FIG. 2A, disposed on a surface of the Flex PCB 228 are a series of skin temperature sensors ("Screen Sensors") 230 configured to measure the skin temperature at varying locations of the "top" of the PCD 200—e.g. the Touch Screen 220—as discussed below. The Screen Sensors 230 may be sensors like the Temperature Sensors 157C discussed above in FIG. 1.

For example, in the exemplary embodiment of FIG. 2A, the Screen Sensors 230 are thin thermistors, however, other types of temperature sensors may be used as desired in different embodiments. In various embodiments, the Screen Sensors 230 may all be the same type of sensors; while in other embodiments, the Screen Sensors 230 may comprise a variety of different types of sensors. Additionally, in the embodiment illustrated in FIG. 2A, the Screen Sensors 230 are distributed across the entirety of the Flex PCB 228—i.e. across approximately the entirety of the illustrative length "L" shown in FIG. 2A. In other embodiments, the Screen Sensors 230 may not be evenly distributed on the Flex PCB 228 and/or may not be distributed across the entirely of the Flex PCB 228, as discussed more fully below with respect to FIG. 3A.

In the exemplary embodiment shown in FIG. 2A, the Flex PCB 228 containing the Screen Sensors 230 may be the same flexible PCB that contains or holds other components, such as controllers, touch sensors, etc., (not shown) used to operate or control the Display 232 and/or Touch Screen 220. In other embodiments, the Flex PCB 228 may be a different or separate PCB than the flexible PCB in the Display 232 that contains these components, controllers, touch sensors, etc., used to operate or control the Display 228 and/or Touch Screen 220.

As illustrated in FIG. 2A, the "bottom" surface of the PCD 200 generally comprises a Back Cover 240 and a Layer 242. The Back Cover 240 may be made of any suitable material such as plastic, metal, wood, etc., as desired by either the user of manufacturer of the PCD 200. Similarly, the Layer 242 may be any appropriate material, such as graphite. In the embodiment illustrated in FIG. 2A, a second Flex PCB 248 is interposed between the Layer 242 and the Back Cover 240.

The Flex PCB 248 is a thin and flexible layer that may be formed from any material desired, and in some embodiments may be formed of the same material as Flexible PCB 228 discussed above. As shown in FIG. 2A, the Flex PCB 248 may be oriented in the PCD 200 generally parallel to the main PCB 204, with the Flex PCB 248 located proximal or near to another outer surface of the PCD 200—i.e. the Back Cover 240 in the embodiment of FIG. 2A. Disposed on a surface of Flex PCB 248 are a series of skin temperature sensors ("Cover Sensors") 250 configured to measure the skin temperature at varying locations of the "bottom" of the PCD 200—e.g. the Back Cover 240 of the PCD 200—as discussed below. The Cover Sensors 250 may also be sensors like the Temperature Sensors 157C discussed above in FIG. 1.

For example, in the exemplary embodiment of FIG. 2A, the Cover Sensors 250 are thin thermistors, however, other types of temperature sensors may be used as desired in different embodiments. Further, in various embodiments, the Cover Sensors 250 may all be the same type of sensors; while in other embodiments, the Cover Sensors 250 may comprise a variety of different types of sensors. Similarly, in some embodiments the Cover Sensors 250 may the same types of sensors as the Screen Sensors 230 discussed above. In other embodiments, the Cover Sensors 250 may be different types of sensors than the Screen Sensors 230.

In the embodiment illustrated in FIG. 2A, the Cover Sensors 250 are distributed across the entirety of the Flex PCB 248—i.e. across approximately the entirety of the illustrative length "L" shown in FIG. 2A. In other embodiments, the Cover Sensors 250 may not be evenly distributed on the Flex PCB 248 and/or may not be distributed across the entirely of the Flex PCB 248, as shown in FIG. 2B and FIGS. 3A-3B.

Turning to FIG. 2B, the front view of the PCD 200, some of the components of the PCD 200 shown in FIG. 2A are hidden. As illustrated in FIG. 2B, the exemplary PCD 200 also includes a Battery 260 disposed on the "interior" of the PCD 200 between the "upper surface" Touch Screen 220 and the "bottom surface" Back Cover 240. As also illustrated in FIG. 2B, the Flex PCB 228 containing the Screen Sensors 230 may extend across approximately the entirety of the width "W" of the PCD 200, while the Flex PCB 248 containing the back Cover Sensors 250 may extend only part of the way across the width "W" of the PCD 200. In other embodiments, the Flex PCB 248 containing the back Cover Sensors 250 may extend further across the width "W" of the PCD 200, including to approximately the entirety of the width "W." However, as illustrated in FIG. 2B, it is not necessary that the Flex PCB 248 and/or the back Cover Sensors 250 on Flex PCB 248 have the same dimensions, coverage, or configuration as the Flex PCB 228 or Screen Sensors 230 on Flex PCB 228.

Figure 3A:
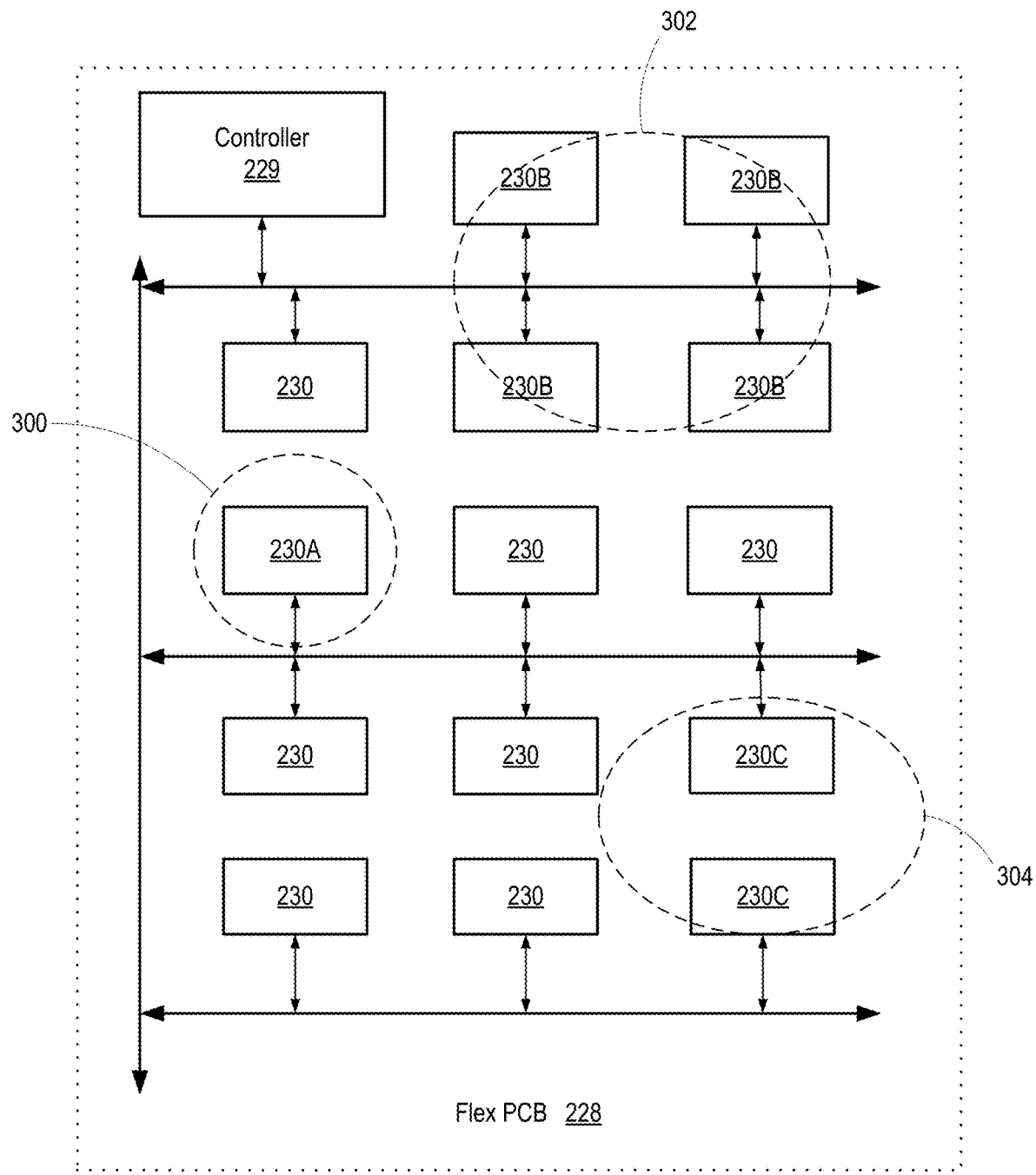
FIG. 3A is a block diagram showing an exemplary embodiment of aspects of the PCD illustrated in FIGS. 2A and 2B.
Figure 3B:
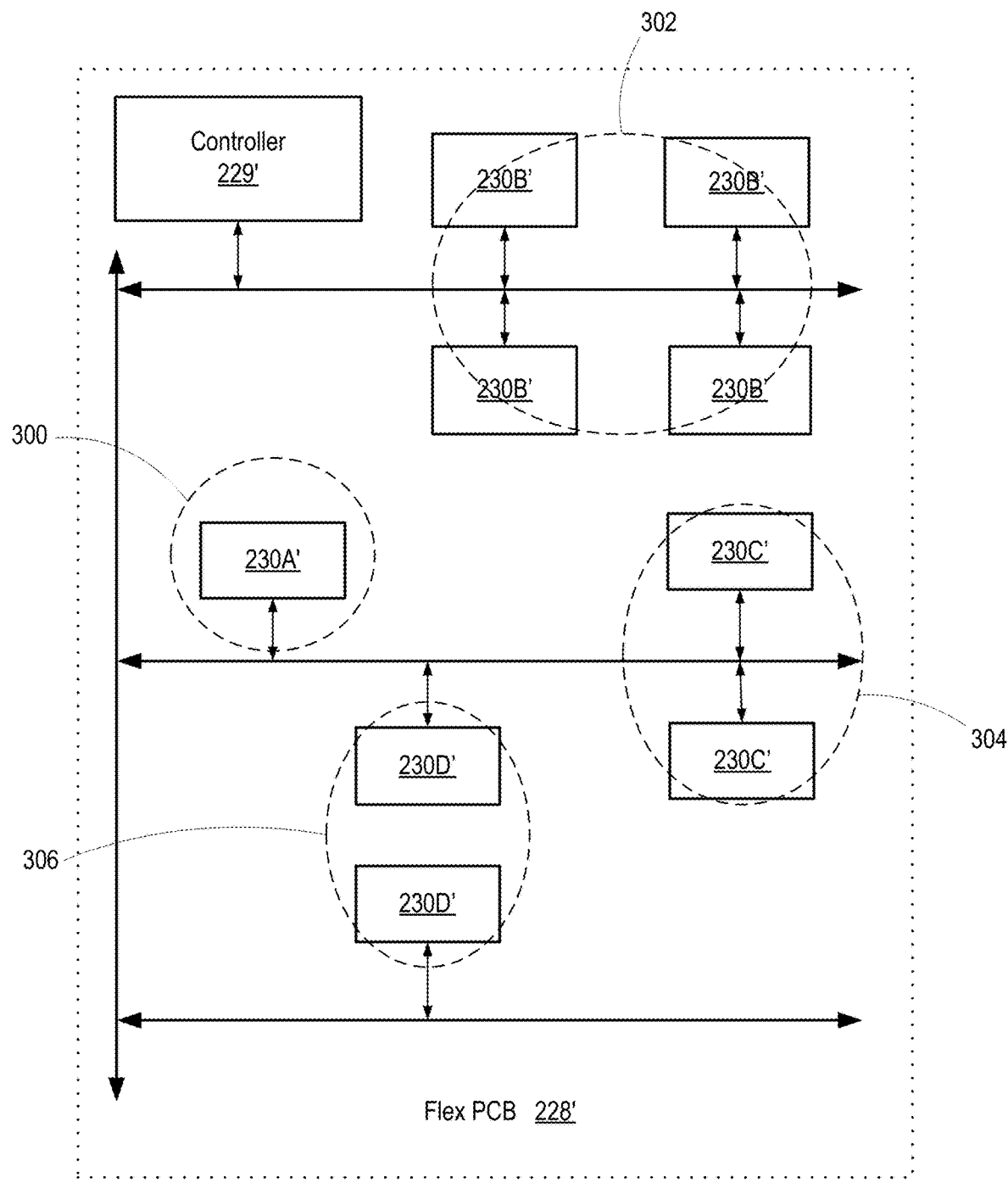
FIG. 3B is a block diagram showing another exemplary embodiment of aspects of the PCD illustrated in FIGS. 2A and 2B.

FIGS. 3A and 3B are block diagrams showing exemplary embodiments of aspects of the PCD illustrated in FIGS. 2A and 2B. FIG. 3A is a block diagram showing an exemplary portion of the Flex PCB 228 of FIGS. 2A-2B, with an illustrative arrangement of Screen Sensors 230. Similarly, FIG. 3B shows a different example of the Flex PCB 228' of FIGS. 2A-2B, with a different illustrative arrangement of Screen Sensors 230'. Note that although FIGS. 3A-3B illustrate Flex PCB 228/228' and Screen Sensors 230/230', these FIGS. 3A-3B and the discussion of these figures below apply equally to Flex PCB 248 and back Cover Sensors 250 of FIGS. 2A-2B.

Beginning with FIG. 3A, a portion of Flex PCB 228 is illustrated with multiple Screen Sensors 230 aligned in roughly a grid pattern. In other embodiments, the Flex PCB 228 may contain more, or fewer, Screen Sensors 230 and/or the Screen Sensors 230 may be arranged differently such as in a different pattern, or in no particular pattern. For example, as illustrated in FIG. 3B the Screen Sensors 230' may not be arranged in a pattern at all, but may instead be located or "clustered" around different regions 300, 302, 304, 306 of the Flex PCB 228'. In an embodiment one or more of these regions 300, 302, 304, 306 of the Flex PCB 228/228' correspond to a spatial location on the main PCB 204 of components expected or determined to be producing thermal energy that may impact the skin temperature as discussed below.

In the exemplary embodiments of FIGS. 3A and 3B, the Screen Sensors 230/230' are all in communication with a Controller 229/229'. In an embodiment, the Controller 229/229' that may operate to turn on and off, receive information from, and/or provide information to, one or more of the Screen Sensors 230/230'.

As discussed above, in some embodiments the Flex PCB 228/228' may be a flexible PCB already provided for the Display 232 (FIG. 2A) in order to assist in the operation or control of the Display 232 or Touch Screen 220 (FIG. 2A). In such embodiments, the Flex PCB 228/228' may contain additional components, circuits, controllers, touch sensors, etc., (not illustrated in FIGS. 3A-3B) to effect such operation or control of the Display 232 or Touch Screen 220 (FIG. 2A). In such embodiments, the Controller 229/229' may be an already existing component on the Display 232 flexible PCB that is also used to operate and/or communicate with the Screen Sensors 230/230'.

In some embodiments, the Controller 229/229' of FIGS. 3A-3B may be a separate control on the Display 232 flexible PCB that is dedicated for the Screen Sensors 230/230'. Further, if desired, more than one Controller 229/229' could be used to operate and/or communicate with one or more of the Screen Sensors 230/230', such as differing Controllers 229/229' dedicated to different sets or groups of Screen Sensors 230/230' (not illustrated).

In other embodiments, the Flex PCB 228/228' of FIGS. 3A-3B may be a separate PCB from the flexible PCB already provided for the Display 232 (FIG. 2A). In such embodiments, the Controller 229/229' may be dedicated for the Screen Sensors 230/230'. In yet other embodiments, the Controller 229/229' for the Screen Sensors 230/230' may not be located on the Flex PCB 228/228' at all, but may be a remotely located component (or multiple components) in communication with one or more of the Screen Sensors 230/230'.

As also illustrated in the exemplary embodiment of FIG. 3A, different Screen Sensors 230 or different groups of Screen Sensors 230 may be associated or identified with different regions 300, 302, 304. The different regions 300, 302, 304 may correspond to a spatial location on the main PCB 204 (FIG. 2A-2B) of components that produce thermal energy or heat. Thus, in embodiments certain Screen Sensors 230, or groups of Screen Sensors 230, may be used to "target" components that are known to produce high levels of thermal energy and/or components that are determined to be currently operating at a high frequency/workload/etc., in order to identify or measure changes in skin temperature associated with the components producing high levels of thermal energy.

For example, in the embodiments of FIG. 3A-3B, Screen Sensor 230A/230A' may be located on the Flex PCB 228/228' in an area that corresponds spatially to the location on the main PCB 204 of the SoC 202 (FIG. 2A). Thus, Screen Sensor 230A/230A' may be associated or identified with SoC Region 300 and Screen Sensor 230A/230A' may be activated and/or monitored for use cases where the SoC 202 (FIG. 2A) is expected or determined to be operating at a high rate/workload/frequency/etc.

Similarly, in the embodiments, a second group or set of Screen Sensors 230B/230B' may be located on the Flex PCB 228/228' in an area that corresponds spatially to the location on the main PCB 204 of the Camera 216 (FIG. 2A). Thus, one or more of Screen Sensors 230B/230B' may be associated or identified with Camera Region 302 and one or more of Screen Sensors 230B/230B' may be activated and/or monitored for use cases where the Camera 216 (FIG. 2A) is expected or determined to be operating at a high workload/frequency/etc.

In the embodiment of FIGS. 3A-3B, a third group or set of Screen Sensors 230C/230C' may be located on the Flex PCB 228/228' in an area that corresponds spatially to the location on the main PCB 204 of the PMIC 208 (FIG. 2A). Thus, one or both of Screen Sensors 230C/230C' may be associated or identified with PMIC Region 304 and one or both of Screen Sensors 230C/230C' may be activated and/or monitored for use cases where the PMIC 208 (FIG. 2A) is expected or determined to be operating at a high workload/frequency/etc.

In different embodiments, Screen Sensors 230/230' may be associated or identified with more or fewer regions 300, 302, 304 than those illustrated in FIG. 3A. For example, as illustrated in FIG. 3B, a fourth group or set of Screen Sensors 230D' may be located on the Flex PCB 228' in an area that corresponds spatially to the location on the main PCB 204 of the Modem 212 (FIG. 2A). Thus, one or both of Screen Sensors 230D' may be associated or identified with Modem Region 306 and one or both of Screen Sensors 230D' may be activated and/or monitored for use cases where the Modem 212 (FIG. 2A) is expected or determined to be operating at a high rate/workload/frequency/etc.

The Screen Sensors 230/230' may be implemented to provide temperature information for their respective location on the Flex PCB 228, each Screen Sensor 230/230' location being associated with a corresponding spatial location on the Touch Screen 220 (FIGS. 2A-2B). In this manner the Screen Sensors 230/230' may be used to provide more accurate information about the skin temperature of the Touch Screen 220 than is currently available, as well as localized temperature information about specific portions, locations, or areas of the Touch Screen 220. As would be understood, the same is true with respect to the back Cover Sensors 250 providing more accurate information about the skin temperature of the Back Cover 240 than is currently available, as well as localized temperature information about specific portions, locations, or areas of the Back Cover 240.

Thus, in an embodiment all of the Screen Sensors 230/230' (and/or back Cover Sensors 250) may be activated and/or "read" to monitor the skin temperature of the Touch Screen 220 (and/or Back Cover 240) to ensure that skin temperature thresholds are not exceeded. In other embodiments, one or more of the Screen Sensors 230/230' (and/or back Cover Sensors 250) may be selectively activated and/or "read" to obtain temperature information about spatial locations of that/those Screen Sensor(s) 230/230' (and/or Cover Sensor(s) 250).

For example, as mentioned above, if it is determined or expected that the PMIC 208 is producing thermal energy or excessive thermal energy, Screen Sensors 230C/230C' may be activated and/or "read" to obtain skin temperatures in the region of the PCD 200 where the PMIC 208 is located. In this manner, rather than being forced to rely on on-die temperature sensors near the PMIC 208, and a corresponding estimation of the skin temperature, a more accurate measurement of any changes to the skin temperature caused by operation of the PMIC 208 may be obtained.

This more accurate measurement more precisely ensures that skin temperature thresholds are not exceeded. Additionally, this more accurate measurement of any changes to the skin temperature caused by the operation of the PMIC 208 also prevents overly conservative application of thermal mitigation algorithms or policies that would begin throttling the performance of the PMIC 208 based on on-die temperature sensors well before the actual skin temperature threshold has been reached. The same is true for the other Screen Sensors 230/230' that are associated or identified with a region 300, 302, 304, 306 illustrated in FIG. 3A-3B, and additional regions not shown in FIGS. 3A-3B.

Thus, implementation of the Screen Sensors 230/230 (and/or Cover Sensors 250) can improve performance by preventing performance losses regularly seen in current thermal mitigation strategies from estimating skin temperatures from on-die sensors.

TABLE 1

|  | Single core burst use case | | |
| --- | --- | --- | --- |
| System (W) | 9.35 | 8.55 | 7.85 |
| SOC (W) | 6.78 | 6.14 | 5.58 |
| CPU core (W) | 6.24 | 5.6 | 5.58 |
| Backcover (° C.) | 43 | 42 | 41 |
| Touchscreen (° C.) | 40 | 39 | 38 |
| SOC (° C.) | 150 | 138 | 127 |

For example, as illustrated in Table 1, above it has been determined that die temperature sensors "Die(C)" for a single core CPU measured 150 degrees at a 6.24 W workload, which cause thermal mitigation policies to throttle the CPU for skin temperature considerations. However, using screen temperature measurements like Screen Sensors 230/230, the actual skin temperature "TouchScreen(C)" resulting from this same CPU workload level was determined to be 40 degrees, below the level required for thermal mitigation. Moreover, as seen from FIG. 1, changes in CPU workload that resulted in drastic swings in the measured die temperature resulted in far smaller changes in skin temperature than would be expected from measuring the die temperature and extrapolating the skin temperature.

Figure 4:
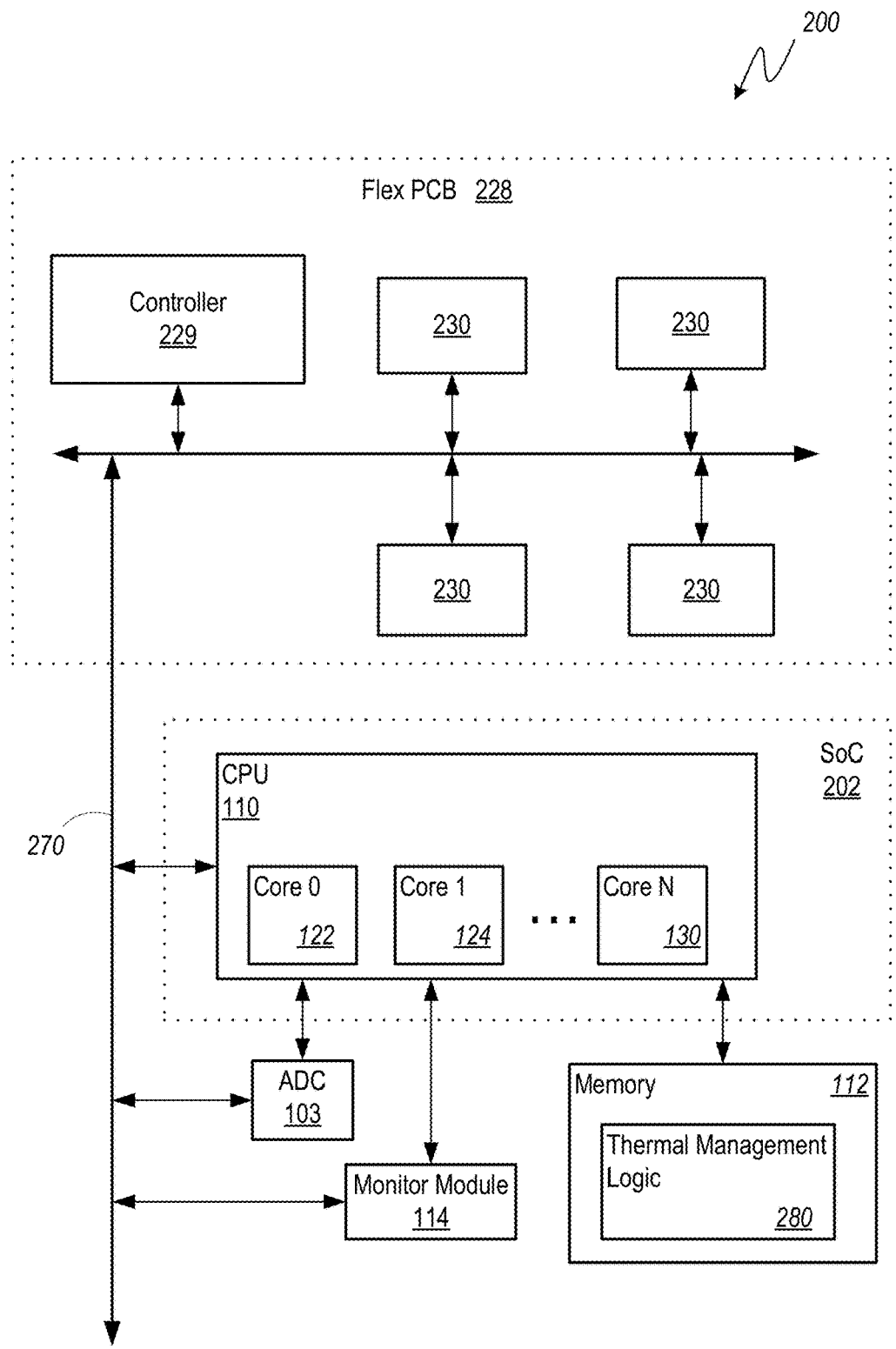
FIG. 4 is a functional block diagram illustrating an example embodiment of components of the PCD of FIGS. 2A and 2B that may be used to perform a method for improved thermal management with skin temperature sensors.

FIG. 4 is a functional block diagram illustrating exemplary components of the PCD 200 of FIGS. 2A and 2B that may be used to perform a method for improved thermal management using the Screen Sensors 230 and/or back Cover Sensors 250. As illustrated in the embodiment of FIG. 4, the Screen Sensors 230 and/or Controller 229 of an exemplary portion of Flex PCB 228 are in communication with the SoC 202 of the PCD 200 (and in particular with the multi-core CPU 110 of the SoC 202 in FIG. 4). Although the discussion of FIG. 4 is limited to Screen Sensors 230 on the Flex PCD 228 for the sake of clarity, this discussion and the disclosure of FIG. 4 are equally applicable to the back Cover Sensors 250 of Flex PCB 248 (FIG. 2A). Thus, the various components illustrated in FIG. 4 and discussed below could be in communication with the back Cover Sensors 250 and/or Controller 249 of Flex PCB 248 instead of, or in addition to, the Screen Sensors 230 illustrated in FIG. 4.

The Screen Sensors 230 and/or Controller 229 of Flex PCB 228 portion illustrated in FIG. 4 are also in communication with an ADC controller ("ADC") 103 and a Monitor Module 114, which are both also in communication with the CPU 110 of the SOC 202. Additionally, a Memory 112 containing Thermal Management Logic 280 is also in communication with the CPU 110 of the SoC 202. Note that the number and arrangement of the components illustrated in FIG. 4 is illustrative, and that more or fewer components may be present and/or such components may be arranged differently in other embodiments. Although illustrated in FIG. 4 as being external to the SoC 202, one or more of the ADC 103, Monitor Module 114 and/or Memory 112 may be part of the SoC 202 in some embodiments. For example, the Memory 112 is a non-volatile data storage device such as a flash memory or a solid-state memory device. Although depicted as a single device, the Memory 112 may be a distributed memory device with separate data stores coupled to the CPU 110 (or additional processors or components). Further, parts of said distributed memory may be located on the Flex PCB 228, the SoC 202, and/or the PCB 204 of the PCD 200 (FIG. 2A).

Additionally, although illustrated as separate components for illustrative purposes in FIG. 4, different components shown in FIG. 4 may comprise a single component in some embodiments. For example, in some embodiments the Monitor Module 114 may not be a separate component as illustrated in FIG. 4. Instead, the various functions of the Monitor Module 114 discussed below may instead be performed by one or more of the Controller 229 on the Flex PCB 228, the Screen Sensors 230 themselves, the ADC 103 and/or the Thermal Management Logic 280 that is illustrated as being located in the Memory 112.

Any number of algorithms may form, or be part of, at least one thermal management policy that may be applied by the Thermal Management Logic 280, such as when certain thermal conditions are met. In an embodiment the Thermal Management Logic 270 may work with other components of the PCD 200 to apply, workload re-allocation, voltage scaling policies, frequency scaling policies, or other throttling measures to individual thermal aggressors of PCD 200, such as SoC 202, CPU 110, PMIC 208, EMCC 210, Camera 216, Modem 212 (see FIG. 2A), and/or other components. In the embodiment of FIG. 4, the Thermal Management Logic 280 is illustrated as located in Memory 112. In other embodiments, Thermal Management Logic 280 may not be located in Memory 112. For example, in an embodiment Thermal Management Logic 280 may be part of the Monitor Module 114.

The medium for the SoC 202, CPU 110, ADC 103, and Monitor Module 114 to communicate with each other, and with the Flex PCB 228 and/or Controller 229 and Screen Sensors 230 may be any desired communication medium or mediums. The communication medium is shown for illustrative purposes in FIG. 4 as a bus 270. Bus 270 may include multiple communication paths via one or more wired or wireless connections, as is known in the art. Depending on the implementation, bus 270 may include additional elements, which are omitted for simplicity, such as controllers, buffers (caches), drivers, repeaters, and receivers, to enable communications. Further, bus 270 may include address, control, and/or data connections to enable appropriate communications among the various components illustrated in FIG. 4 and/or additional components of the PCD 200 if desired.

One or more of the components illustrated in FIG. 4 may be responsible for monitoring, communicating with, controlling, operating one or more of the Screen Sensors 230, obtaining temperature information from one or more of the Screen Sensors 230, and/or using the temperature information as part of a thermal mitigation policy for one or more portion of the PCD 200.

In an embodiment, skin temperature information from one or more Screen Sensors 230 may be taken by the ADC 103 successively sampling Screen Sensors 230. For example, if the Screen Sensors 230 are thermistors, the ADC 103 may be used to sample the voltage between the thermistor and pull up resistor. To save power, embodiments where the Screen Sensors 230 are thermistors, the low dropout (LDO) regulator of the thermistor may be "turned off" until the ADC 103 performs the sampling.

The ADC 103 may perform such sampling for a predetermined period of time and/or at predetermined time intervals in some embodiments. For example, a thermal management policy implemented by Thermal Management Logic 280 may cause the ADC 103 to sample one or more Screen Sensors 230 for a predetermined period of time (e.g. during the implementation of a particular mitigation event, upon the happening of some event or reaching of some threshold, or as part of the regular operation of the PCD).

Continuing with the example, the Thermal Management Logic 280 may also, or alternatively, cause the ADC 103 to perform such sampling at a pre-determined time interval, such as 100 ms. As would be understood by one of ordinary skill, more than one ADC 103 may be implemented if a large number of Screen Sensors 230 are to be sampled and/or if the sampling is required to take place at relatively short time intervals. Moreover, the ADC 103 as well as any additional ADCs may be located on the PCB 204 external to the SoC 202, as part of the SoC 202, or as part of the one or more of Flex PCBs 228/248 (see FIGS. 2A-2B). Further, as would be understood by one of ordinary skill other methods of obtaining the temperature information from the Screen Sensors 230 may be implemented as desired.

In other embodiments, obtaining the skin temperature information from one or more Screen Sensors 230 may also, or alternatively, be accomplished adaptively during the operation of the PCD 200. In such embodiments, one or more components illustrated in FIG. 4 may determine which Screen Sensors 230 to obtain skin temperature information from based on one or more operational condition of the PCD 200. Exemplary operational conditions include the identification of one or more component of the PCD 200 producing thermal energy (or excessive thermal energy), the implementation of thermal management policies, or the operational state of one or more component of the PCD.

Based on one or more of the types of information discussed above, the Monitor Module 114, acting either alone or in conjunction with another component may obtain information about the skin temperature and/or any skin temperature changes resulting from the thermal energy produced by one or more components of the PCD 200. The Monitor Module 114 may, for example, in some embodiments cause the ADC 103 to sample certain Screen Sensors 230 as discussed above. Identification of which Screen Sensors 230 to obtain skin temperature information from may be determined by one or more of the Thermal Management Logic 280, the Monitor Module 114, or the Controller 229 taking into consideration one or more of the parameters identified above. In such embodiments, the identified Screen Sensors 230, or groups of Screen Sensors 230 sampled may correspond to one or more components of the PCD 200 determined to be producing thermal energy—e.g. Screen Sensors 230 that correspond spatially with one or more component of the PCD 200 producing thermal energy (see region 300, 302, 304, 306 in FIGS. 3A-3B).

Figure 5A:
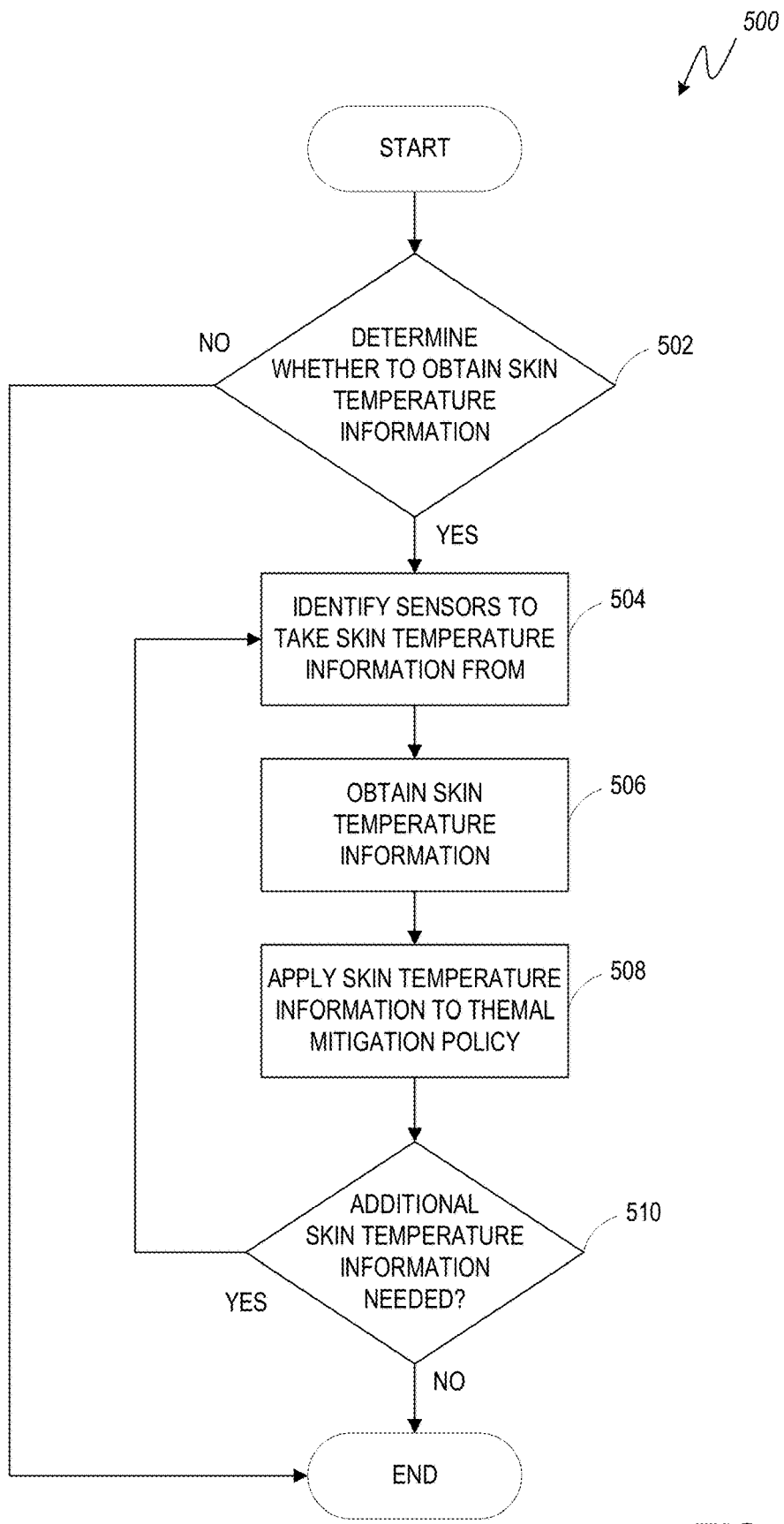
FIG. 5A is a logical flowchart illustrating an exemplary method for improved thermal management with skin temperature sensors.

Turning to FIG. 5A, this figure is a logical flowchart illustrating an exemplary method 500 for improved thermal management with skin temperature sensors. Beginning at Block 502 a determination is made whether to obtain skin temperature information. As discussed above, the decision whether to obtain skin temperature information in Block 502 may be determined at startup of the PCD 200 such as part of start-up logic, or as part of a thermal management policy implemented by Thermal Management Logic 280, that causes skin temperature information to be obtained for a predetermined period of time and/or at predetermined time intervals in some embodiments. Such periods of time and/or time intervals may be pre-determined and/or determined irrespective of any current operating conditions of the PCD 200.

In other embodiments, the determination in Block 502 may also, or alternatively, be accomplished during the operation of the PCD 200, such as based on one or more operational condition of the PCD 200. Exemplary operational conditions include the identification of one or more component of the PCD 200 producing thermal energy (or excessive thermal energy), the implementation of thermal management policies, or the operational state of one or more component of the PCD.

For example, in an embodiment, the determination of Block 502 may comprise monitoring and/or recognizing various parameters indicating that one or more components of PCD 200 (such as SoC 202, PMIC 208, Modem 212, etc., of FIG. 2A-2B) are producing thermal energy. In an embodiment, this monitoring and/or recognizing may be performed by a Monitor Module 114 like that discussed in FIG. 4. Such parameters may include information from one or more power rail indicating components of the PCD 200 currently being powered, power consumption by these components, and/or rates of change of power consumption by various components. Such parameters may also include information from on-die temperature sensors indicating that components of the PCD 200 are producing thermal energy, levels of thermal energy being produced and/or rates of change of thermal energy production. Such parameters may also (or instead) include information about power states the PCD 200 is entering into or leaving, clock frequencies for various components, voltage levels for various components, information from one or more thermal management policy or algorithm being implemented on the PCD, etc.

For such embodiments, based on one or more of the types of information discussed above, the determination in Block 502 is made whether to obtain information about the skin temperature and/or any skin temperature changes resulting from the thermal energy produced by one or more components of the PCD 200. In varying embodiments, one or more of the Monitor Module 114, Controller 229, or Thermal Management Logic 280, may make this determination. For example, the Monitor Module 114 may perform the monitoring and make the determination whether to obtain skin temperature information in an embodiment. In other embodiments, the Thermal Management Logic 280 may make the determination based on information provided by the Monitor Module 114. In yet other embodiments, the Controller 229 may make the determination of Block 502 to obtain such skin temperature information, either by itself or based on information received from the Monitor Module 114 (or from other components of the PCD 200).

If the determination in Block 502 is not to obtain skin temperature information the method 500 ends. If the determination in Block 502 is to obtain skin temperature information, the method 500 continues to Block 504 where sensors from which to take skin temperature information are identified. The sensors of block 504 may include one or more of Screen Sensors 230 and/or one or more of Cover Sensors 250 (FIGS. 2A-2B, 3A-3B).

In some embodiments, the identification of the sensors in block 504 may be made at a predetermined time, such as at startup of the PCD 200 as part of start-up logic, or upon the implementation of a thermal management policy by Thermal Management Logic 280 that causes skin temperature information to be taken from pre-identified sensors. For example, in an embodiment, a determination whether to obtain skin temperature information in Block 502 as part of a pre-set thermal management policy may require obtaining the skin temperature information for the entirety of the Touch Screen 202—e.g. obtaining skin temperature information from multiple Screen Sensors 230 in differing locations on the Flex PCB 228 that correspond spatially with part or all of the Touch Screen 202, regardless of the location of any other components in the PCD 200. The number and location of such Screen Sensors 230 from which the skin temperature information is obtained in such embodiments may be predetermined such as by one or more of Thermal Management Logic 280, Monitor Module 114 or Controller 229.

In other embodiments, the determination to obtain skin temperature information may be based on operating parameters of the PCD, such as PCD 200. For example, in embodiments where the determination to obtain the skin temperature information in Block 502 is based on operational parameters of the PCD 200, the determination in Block 502 may include an identification of particular sensors, or may result in an additional identification step 504 of one or more specific sensors from which to obtain skin temperature information.

For example, in such embodiments, a particular Screen Sensor 230, or group of Screen Sensor 230 may be identified in Block 504 from which to take skin temperature information. These identified Screen Sensors 230 may correspond to one or more components of the PCD 200 determined to be producing thermal energy—e.g. Screen Sensors 230 (or back Cover Sensors 250) that correspond spatially with one or more component of the PCD 200 producing thermal energy (see, e.g., region 300, 302, 304, 306 in FIGS. 3A-3B). Further, in some embodiments more than one set of Screen Sensors 230—i.e. a second set of Screen Sensors 230, and third set of Screen Sensors 230, etc.—may be identified in Block 504. In an embodiment, identification of the Screen Sensors 230 and/or back Cover Sensors 250 from which to obtain skin temperature information may be determined during operation of the PCD 200, such as by one or more of the Thermal Management Logic 280, the Monitor Module 114, or the Controller 229 (FIG. 4).

Figure 6:
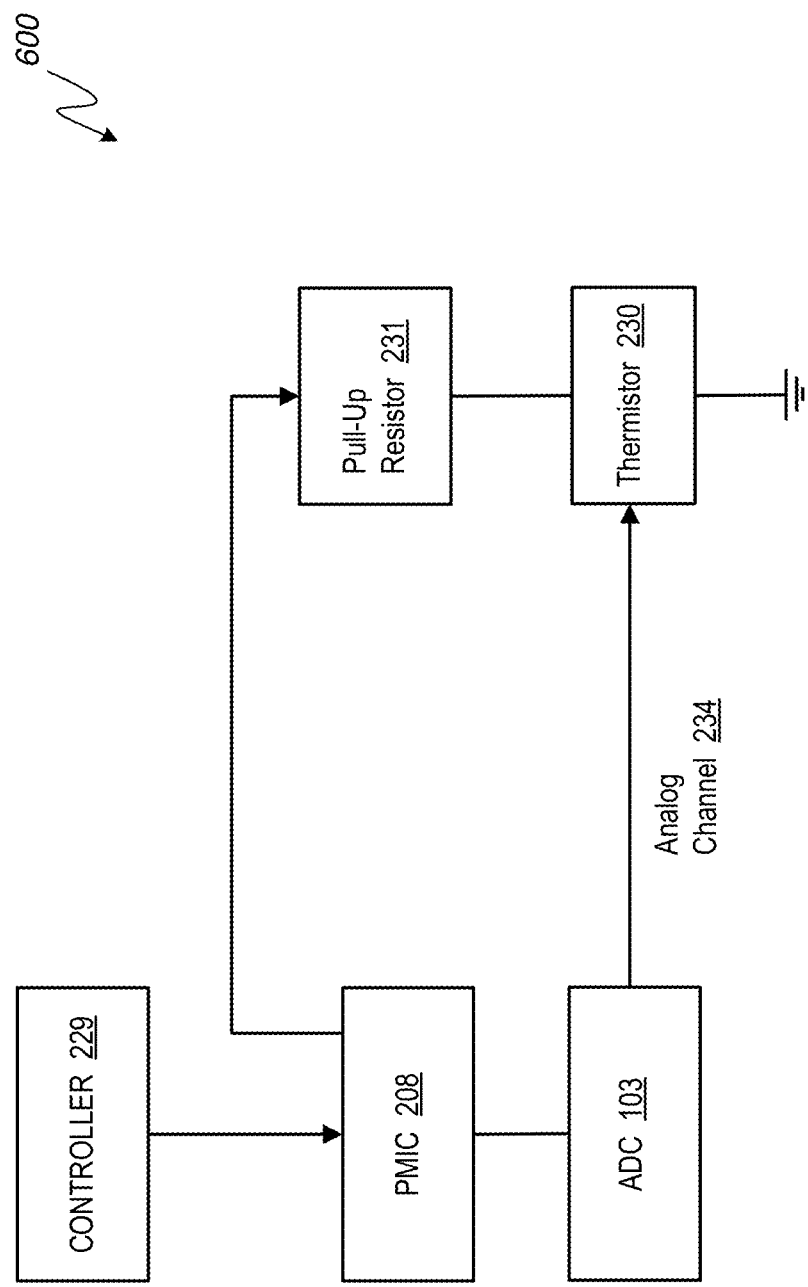
FIG. 6 is a block diagram showing the inter-operation of portions of the embodiment of FIG. 2A.

In some embodiments, identifying the sensors in block 504 may also include turning the identified sensors "on," providing power to the identified sensors and/or waking the identified sensors from a reduced power state. For example, in an embodiment, the sensors, such as Screen Sensors 230 and/or back Cover Sensors 250 may be turned off/unpowered until skin temperature information is needed from them. In such embodiments, identifying the sensors in Block 504 may also include sending a signal, communication, such as from Controller 229/249 to cause the identified sensors to be powered/brought from a reduced power state. For example, as illustrated in FIG. 6, in some embodiments, a signal from Controller 229 may cause PMIC 208 (see FIG. 2A) to power up a resistor 231. Once the Resistor 231 is powered, the ADC 103 may then sample, such as over the analog channel 234, a the voltage between the Thermistor 230 (in this example case the thermistor is for a Screen Sensor 230) and the Resistor 231.

Figure 5B:
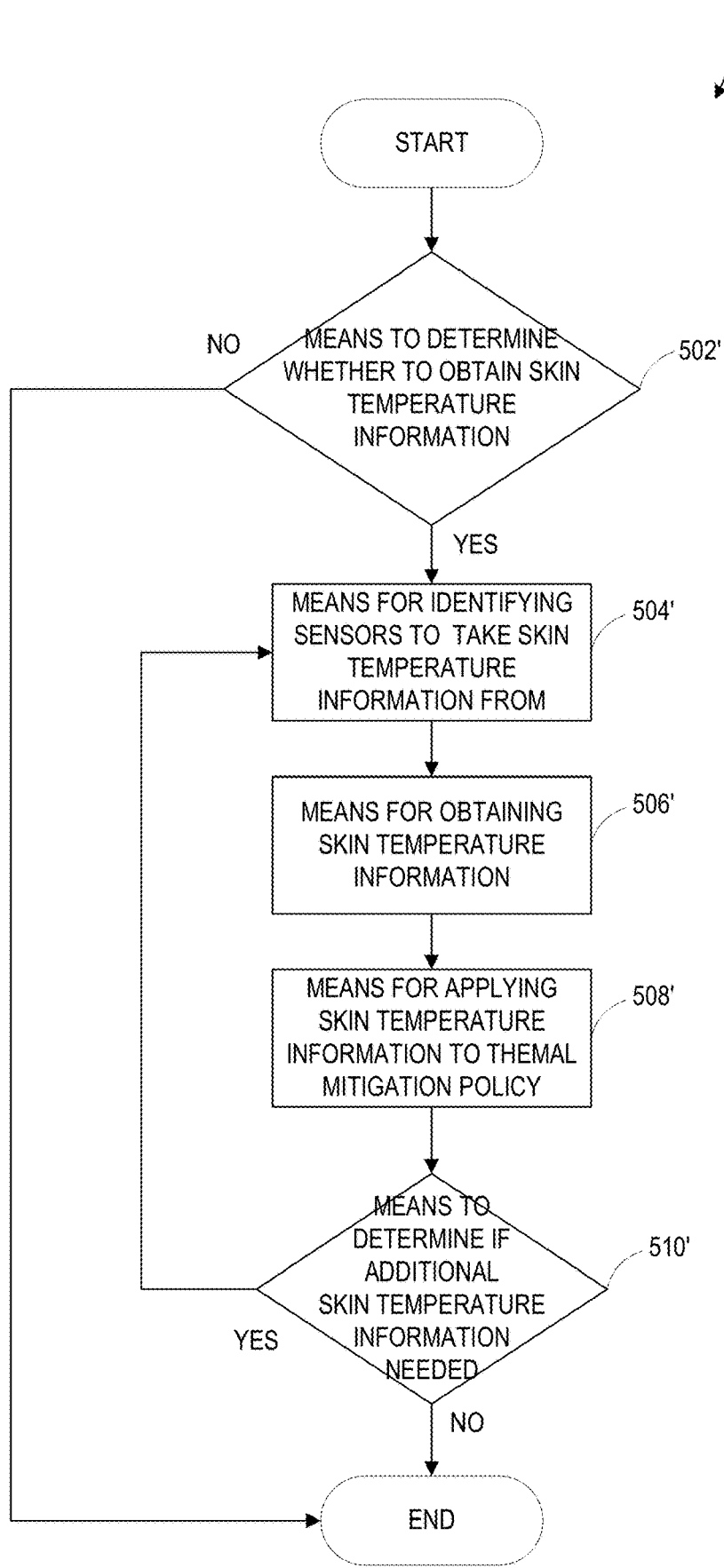
FIG. 5B is a logical flowchart illustrating an exemplary components for performing the method of FIG. 5B.

Returning to FIG. 5, in Block 506, skin temperature information is obtained from the identified sensors, such as identified Screen Sensors 230 and/or Back Cover Sensors 250. In some embodiments, obtaining the skin temperature information in Block 506 may comprise one or more ADC 103 sampling the identified sensors. For such embodiments where the sensors are thermistors, the ADC(s) 103 may be used to sample the voltage between the thermistor and pull up resistor as discussed above for FIG. 4. However, other methods of obtaining the skin temperature information, including changes in the skin temperature as desired, may be implemented in Block 506.

In optional Block 508, the skin temperature information obtained in block 506 may be applied to a thermal mitigation policy. For embodiments where the skin temperature information is being obtained as a result of an identification of thermal energy being produced by one or more component of the PCD 200, the skin temperature information obtained in Block 506 may be input into the thermal mitigation policy algorithm, program, or logic, such as a thermal management policy implemented by Thermal Management Logic 280 of FIG. 4. As discussed above, such use of the skin temperature information allows for improved and/or more precise application of thermal mitigation policies, especially such policies that limit the performance, workload, or operation of components based on skin temperature thresholds.

In Block 510, a determination is made whether additional skin temperature information needed. In embodiments where skin temperature information is being taken periodically, this determination of Block 510 may be a determination whether or not the next period to obtain skin temperature information has occurred. Additionally, in embodiments where skin temperature information is being obtained for a set period of time, the determination in Block 510 may be a determination whether the time period for obtaining the skin temperature has expired.

Additionally, or alternatively, for embodiments where the skin temperature information is being obtained as a result of an identification of thermal energy being produced by one or more component of the PCD 200, the determination of Block 510 may comprise a determination whether there is still a need for such skin temperature information. For such embodiments the determination may be whether the skin temperature has reached/dropped below a threshold, such determination being made by one or more of the sensor itself (such as Screen Sensor 230 or Back Cover Sensor 250), Monitor Module 114, Controller 229/229', or Thermal Management Logic 280.

Similarly, where the skin temperature information is being obtained as a result of an identification of thermal energy being produced, the determination of Block 510 may be a determination whether the component producing thermal energy has been throttled, whether the thermal energy produced has been otherwise mitigated, etc. Again, such determinations may be made by one or more of Monitor Module 114, Controller 229/229', or Thermal Management Logic 280.

As yet another example, where the skin temperature information is being obtained as a result of an identification of thermal energy being produced, the determination of Block 510 may be a determination whether or not a predetermined time period has passed since the sensors began providing skin temperature information. In other words, once the determination in Block 502 is made to obtain skin temperature information as a result of identifying a component producing thermal energy, identified sensors may be "turned on" and information obtained from these identified sensors for a specific or pre-set period of time. In such embodiments, the determination in Block, 510 may be whether this time period has elapsed.

As would be understood, multiple different factors, including combinations of the above-described factors may be used in Block 510 to determine whether additional skin temperature information is needed. If the determination in Block 510 is that additional skin temperature information is not needed, the method 500 ends. As part of the determination in Block 510 that additional skin temperature information is not needed, one or more components of the PCD 200 may cause a signal or other communication be sent to the identified sensors to turn "off" and/or reduce power in some embodiments.

If the determination in Block 510 is that additional skin temperature information is needed, the method 500 returns to Block 504 where sensors to take skin temperature information from are identified as discussed above. Note that it is not necessary that subsequent iterations of method 500 identify in Block 504 the same sensors identified in previous iterations of Block 504.

FIG. 5A describe only one exemplary embodiment of a method for method for improved thermal management with skin temperature sensors in a PCD. In other embodiments, additional blocks or steps may be added to method 500. Similarly, in some embodiments various blocks or steps shown in FIG. 5A may be combined or omitted, such as for example combining blocks 502 and 504 into one determining/identifying block/step rather than the two separate blocks/steps illustrated in FIG. 5A. Such variations of the method 500 are within the scope of this disclosure.

Additionally, certain steps in the processes or process flows described in this specification naturally precede others for the invention to function as described. However, the disclosure is not limited to the order of the steps described if such order or sequence does not alter the functionality. Moreover, it is recognized that some steps may performed before, after, or in parallel (substantially simultaneously) with other steps without departing from the scope of this disclosure. In some instances, certain steps may be omitted or not performed without departing from the scope of the disclosure. Further, words such as "thereafter", "then", "next", "subsequently", etc. are not intended to limit the order of the steps. These words are simply used to guide the reader through the description of the exemplary method 500.

The various operations and/or methods described above may be performed by various hardware and/or software component(s) and/or module(s), and such component(s) and/or module(s) may provide the means to perform such operations and/or methods. Generally, where there are methods illustrated in Figures having corresponding counterpart means-plus-function Figures, the operation blocks correspond to means-plus-function blocks with similar numbering. For example, blocks 502-510 illustrated in FIG. 5A correspond to means-plus-function blocks 502'-510' illustrated in FIG. 5B.

Additionally, one of ordinary skill in programming is able to write computer code or identify appropriate hardware and/or circuits to implement the disclosed method or system without difficulty based on the flow charts and associated description in this specification, for example. Therefore, disclosure of a particular set of program code instructions or detailed hardware devices is not considered necessary for an adequate understanding of how to make and use the disclosed system or method. The inventive functionality of the claimed processor-enabled processes is explained in more detail in the above description and in conjunction with the drawings, which may illustrate various process flows.

In one or more exemplary aspects as indicated above, the functions described may be implemented in hardware, software, firmware, or any combination thereof. If implemented in software, the functions may be stored on or transmitted as one or more instructions or code on a computer-readable medium, such as a non-transitory processor-readable medium. Computer-readable media include both data storage media and communication media including any medium that facilitates transfer of a program from one location to another.

A storage media may be any available media that may be accessed by a computer or a processor. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc ("CD"), laser disc, optical disc, digital versatile disc ("DVD"), floppy disk and Blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made herein without departing from the scope of the present disclosure, as defined by the following claims.

What is claimed is:

1. A method for thermal management in a portable computing device ("PCD"), the method comprising:
providing a plurality of non-capacitive temperature sensors, the plurality of temperature sensors disposed on a first printed circuit board ("PCB") of the PCD, the first PCB located internal to the PCD, separate from and parallel to a main PCB of the PCD;
obtaining external-surface-temperature information from one or more of the plurality of temperature sensors; and
applying the obtained external-surface-temperature information to a thermal mitigation policy, wherein the applying comprises adjusting an operating parameter for at least one component in the PCD to affect the amount of thermal energy generated by the PCD.

2. The method of claim 1, further comprising, prior to obtaining the external-surface-temperature information from the one or more temperature sensors, determining to obtain the external-surface-temperature information from the one or more temperature sensors, wherein the determining comprises:
monitoring a parameter associated with one or more components disposed on the main PCB, the parameter indicating that the one or more components of the main PCB are producing thermal energy.

3. The method of claim 2, wherein the parameter comprises information about one of: an amount of power provided to the one or more components, an operational frequency of the one or more components, a clock speed of the one or more components, and a workload of the one or more components.

4. The method of claim 2, further comprising identifying the one or more temperature sensors from which to obtain external-surface-temperature information, wherein the identifying comprises:
identifying, based on the monitored parameter, a first component of the one or more components of the main PCB that is producing the thermal energy;
identifying the one or more temperature sensors at a location on the first PCB that spatially corresponds to a location of the first component of the one or more components of the main PCB.

5. The method of claim 4, wherein the identifying further comprises:
identifying a second set of one or more temperature sensors at a second location on the first PCB that spatially corresponds to a second location of a second one of the one or more components producing thermal energy on the main PCB; and obtaining temperature information from the identified second set of one or more temperature sensors.

6. The method of claim 4, wherein the identifying further comprises waking up the one or more temperature sensors from a dormant state.

7. The method of claim 1, wherein:
the plurality of temperature sensors includes a dormant set of one or more temperature sensors that are not among the one or more temperature sensors from which external-surface-temperature information is obtained; and
the temperature sensors of the dormant set are held in a dormant state while obtaining the external-surface-temperature information from the one or more of the plurality of temperature sensors.

8. The method of claim 1, wherein the first PCB comprises a printed circuit board for a liquid crystal display ("LCD") of the PCD.

9. The method of claim 1, wherein the first PCB is located adjacent to a back cover of the PCD.

10. The method of claim 1, wherein the operating parameter is one of a clock speed, a voltage, a frequency, and a workload of the at least one component in the PCD.

11. A computer system for thermal management in a portable computing device ("PCD"), the system comprising:
a plurality of non-capacitive temperature sensors, the plurality of temperature sensors disposed on a first printed circuit board ("PCB") located internal to the PCD, proximal to an outer surface of the PCD, separate from and parallel to a main PCB of the PCD; and
a monitor module configured to:
obtain external-surface-temperature information from one or more of the plurality of temperature sensors, and
apply the obtained external-surface-temperature information to a thermal mitigation policy, wherein the applying comprises adjusting an operating parameter for at least one component in the PCD to affect the amount of thermal energy generated by the PCD.

12. The computer system of claim 11, wherein:
the monitor module is further configured to:
monitor a parameter associated with one or more components disposed on the main PCB, the parameter indicating that a first component of the one or more components of PCD is producing thermal energy; and
determine, based on the monitored parameter, to obtain external-surface-temperature information from the one or more of the plurality of skin sensors.

13. The computer system of claim 12, wherein the parameter comprises information about one of: an amount of power provided to the one or more components, an operational frequency of the one or more components, a clock speed of the one or more components, or a workload of the one or more components.

14. The computer system of claim 12, wherein:
the monitor module is further configured to identify the one or more temperature sensors from which to obtain external-surface-temperature information by:
identifying, based on the monitored parameter, a first component of the one or more components of the main PCB that is producing the thermal energy; and
identifying the one or more temperature sensors at a location on the first PCB that spatially correspond to a location of the first component of the one or more components of the main PCB.

15. The computer system of claim 14, wherein the monitor module is further configured to:
identify a second set of one or more temperature sensors at a second location on the first PCB that spatially corresponds to a second location of a second one of the one or more components producing thermal energy on the main PCB, and
obtain temperature information from the identified second set of one or more temperature sensors.

16. The computer system of claim 14, wherein the monitor module is further configured to wake up the one or more temperature sensors from a dormant state.

17. The computer system of claim 11, wherein:
the plurality of temperature sensors includes a dormant set of one or more temperature sensors that are not among the one or more temperature sensors from which external-surface-temperature information is obtained; and
the monitor module is further configured to hold the temperature sensors of the dormant set in a dormant state while obtaining the external-surface-temperature information from the one or more of the plurality of temperature sensors.

18. The computer system of claim 11, wherein the first PCB comprises a printed circuit board for a liquid crystal display ("LCD") of the PCD.

19. The computer system of claim 11 wherein the first PCB is located adjacent to a back cover of the PCD.

20. The computer system of claim 11, wherein the operating parameter is one of a clock speed, a voltage, a frequency, and a workload of the at least one component in the PCD.

21. A computer system for thermal management in a portable computing device ("PCD"), the system comprising:
a plurality of means for non-capacitive temperature sensing, the plurality of means for temperature sensing disposed on a first printed circuit board ("PCB") of the PCD, the first PCB located internal to the PCD, separate from and parallel to a main PCB of the PCD;
means for obtaining external-surface-temperature information from one or more of the plurality of temperature sensors; and
means for applying the obtained external-surface-temperature information to a thermal mitigation policy, wherein the applying comprises adjusting an operating parameter for at least one component in the PCD to affect the amount of thermal energy generated by the PCD.

* * * * *